(12) United States Patent
Ochi et al.

(10) Patent No.: US 7,640,734 B2
(45) Date of Patent: Jan. 5, 2010

(54) VEHICULAR TORQUE CONVERTER AND METHOD FOR CHECKING ASSEMBLY OF THRUST BEARING THEREOF

(75) Inventors: Toru Ochi, Nishikamo-gun (JP); Tomohiro Matsumoto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 286 days.

(21) Appl. No.: 11/565,171

(22) Filed: Nov. 30, 2006

(65) Prior Publication Data
US 2007/0144162 A1    Jun. 28, 2007

(30) Foreign Application Priority Data
Dec. 28, 2005   (JP) .............................. 2005-379693

(51) Int. Cl.
*F16D 33/00* (2006.01)
(52) U.S. Cl. ...................................... 60/345
(58) Field of Classification Search .................. 60/345, 60/362, 365
See application file for complete search history.

(56) References Cited

U.S. PATENT DOCUMENTS

| | | | | |
|---|---|---|---|---|
| 6,044,946 A | * | 4/2000 | Makino et al. | ................ 60/361 |
| 6,941,752 B2 | | 9/2005 | Ochi et al. | |

FOREIGN PATENT DOCUMENTS

| | | |
|---|---|---|
| DE | 199 41 366 A1 | 3/2001 |
| JP | 11-153207 | 6/1999 |
| JP | 2004-132526 | 4/2004 |
| JP | 2005-133731 | 5/2005 |

* cited by examiner

*Primary Examiner*—F. Daniel Lopez
(74) *Attorney, Agent, or Firm*—Oblon, Spivak, McClelland, Maier & Neustadt, L.L.P.

(57) ABSTRACT

A turbine hub has a through-hole extending through it in the axial direction. This through-hole is provided such that a portion of a thrust bearing covers part of the through-hole when the thrust bearing has been properly assembled onto the turbine hub, which enables assembly of the thrust bearing to be checked by the relative position relationship between the through-hole and the thrust bearing. If a portion of the thrust bearing does not cover part of the through-hole, it can be determined that either the thrust bearing is not assembled or that it has not been assembled properly.

8 Claims, 7 Drawing Sheets

|  | C1 | C2 | B1 | B2 | B3 | SPEED RATIO | STEP |
|---|---|---|---|---|---|---|---|
| 1st | O |  |  | O |  | 3.194 | |
| | | | | | | | 1.650 |
| 2nd | O |  | O |  |  | 1.935 | |
| | | | | | | | 1.351 |
| 3rd | O |  |  |  | O | 1.433 | |
| | | | | | | | 1.433 |
| 4th | O | O |  |  |  | 1.000 | |
| | | | | | | | 1.465 |
| 5th |  | O |  |  | O | 0.683 | |
| | | | | | | | 1.190 |
| 6th |  | O | O |  |  | 0.574 | |
| Rev |  |  |  | O | O | 3.586 | TOTAL 5.568 |

VEHICULAR TORQUE CONVERTER AND METHOD FOR CHECKING ASSEMBLY OF THRUST BEARING THEREOF

INCORPORATION BY REFERENCE

The disclosure of Japanese Patent Application No. 2005-379693 filed on Dec. 28, 2005, including the specification, drawings and abstract is incorporated herein by reference in its entirety.

BACKGROUND OF THE INVENTION

1. Field of the Invention

The invention relates to a vehicular torque converter. More particularly, the invention relates to an improvement that makes it easier to check assembly of a thrust bearing during manufacturing and the like of the vehicular torque converter.

2. Description of the Related Art

A torque converter is a fluid power-transmitting device that is provided in a power transmission path between a power source and an automatic transmission of a vehicle and multiplies torque generated by that power source and transmits it to the automatic transmission. The torque converter is provided with a thrust bearing that is assembled onto a turbine hub and rotatably supports a one-way clutch in the circumferential direction with respect to the turbine hub (see Japanese Patent Application Publication No. JP-A-2004-132526). Recently, there is a trend to make the thrust bearing thinner in order to make the torque converter as thin as possible due to a demand to make devices smaller.

With the related art, in order to prevent the thrust bearing from being left out or assembled backwards or the like, the torque converter is provided with a structure in which the height of the assembled turbine when it is assembled properly differs from that when the thrust bearing is missing or has been assembled backwards or the like. In order to make the torque converter as thin as possible, however, it is necessary to eliminate this structure which provided for the sole purpose of checking assembly.

SUMMARY OF THE INVENTION

The purpose of this invention is to provide a vehicular torque converter in which assembly of a thrust bearing can be easily checked, and a method for checking assembly of the thrust bearing of the vehicular torque converter.

Thus, one aspect of the invention relates to a vehicular torque converter which includes a turbine hub which fixes a turbine runner to an output shaft such that the turbine runner does not rotate relative to the output shaft in a circumferential direction; a one-way clutch arranged on an inner peripheral side of a stator; and a thrust bearing that is assembled onto the turbine hub and supports the one-way clutch with respect to the turbine hub such that the one-way clutch is able to rotate relative to the turbine hub in the circumferential direction. The turbine hub has a through-hole that extends through the turbine hub in an axial direction, and the through-hole is such that a portion of the thrust bearing covers part of the through-hole when the thrust bearing is properly assembled onto the turbine hub.

This structure enables assembly of the thrust bearing to be checked from the relative positional relationship of the through-hole and the thrust bearing. If a portion of the thrust bearing does not cover part of the through-hole, then it can be determined that either the thrust bearing is not assembled or it has been assembled improperly. That is, a vehicular torque converter in which assembly of the thrust bearing can easily be checked can be provided.

The through-hole may also be an oil hole for transferring hydraulic fluid. According to this structure, an oil hole provided in the turbine hub can be used as the through-hole for checking assembly. Therefore, assembly of the thrust bearing can easily be checked using the oil hole, so another through-hole does not need to be provided to check assembly.

Also, the thrust bearing may include a plurality of rollers aligned in the radial direction and separated by predetermined intervals in the circumferential direction and a pair of disc-shaped thrust bearing races that sandwich the plurality of rollers, and an inner peripheral edge portion of one of the thrust bearing races that contacts the turbine hub, from among the pair of disc-shaped thrust bearing races, may be shaped to cover part of the through-hole. This enables assembly of the thrust bearing to be easily checked using a practical structure.

A second aspect of the invention relates to a method for checking assembly of a thrust bearing of a vehicular torque converter. This method is characterised by including the step of checking assembly of the thrust bearing based on whether a pin having radial dimensions that enable it to be inserted through the through-hole is able to be inserted at least a predetermined amount through the through-hole when the turbine hub has been assembled onto the vehicular torque converter according to the first aspect described above.

According to this second aspect, the pin is able to be inserted through the through-hole when a portion of the thrust bearing is not covering part of the through-hole, which means that if the pin is able to be inserted through the through-hole, it can be determined that either the thrust bearing is not assembled or that it was not assembled properly. That is, it is possible to provide a method for checking assembly of the thrust bearing of the torque converter in which assembly of the thrust bearing can easily be checked

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 9 is a sectional view of the torque converter shown in FIG. 6 as it appears during assembly in the manufacturing process and the like.

DETAILED DESCRIPTION OF THE PREFERRED EMBODIMENTS

In the following description and the accompanying drawings, the present invention will be described in more detail in terms of exemplary embodiments.

Figures 1, 2:
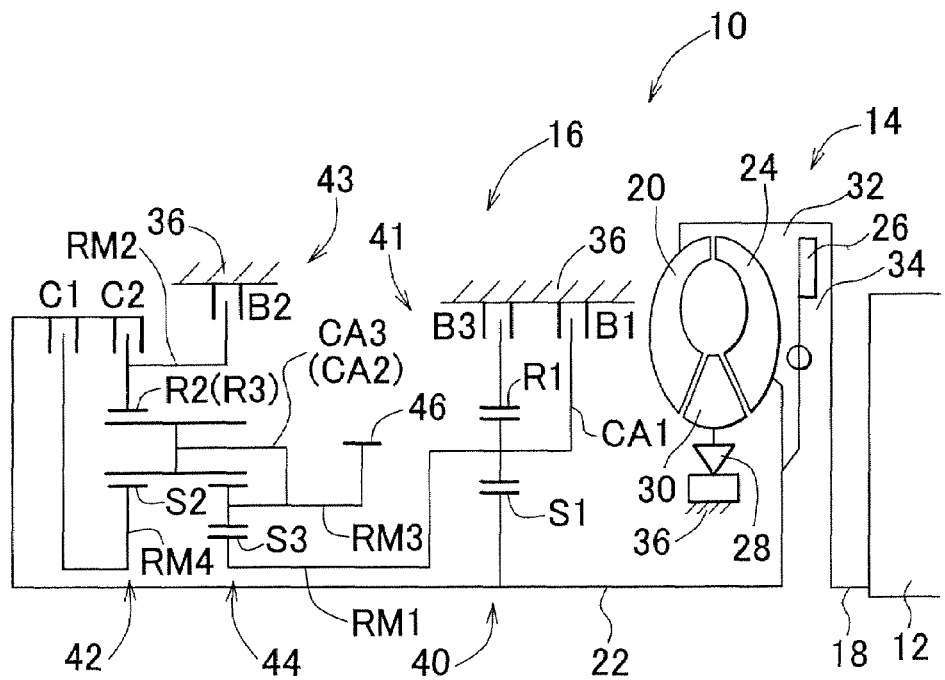
FIG. 1 is a skeleton view of the structure of a power-transmitting device provided with a torque converter according to one example embodiment of the invention.
FIG. 2 is a clutch and brake application chart showing various application and release combinations of clutches and brakes to achieve specific speeds in an automatic transmission shown in FIG. 1.

FIG. 1 is a skeleton view of the structure of a power-transmitting device 10 provided with a vehicular torque converter 14 (hereinafter simply referred to as "torque converter 14") according to a first example embodiment of the invention. This power-transmitting device 10 is used, for example, in a FF (i.e., front engine-front drive) type vehicle having a transverse mounted automatic transmission 16. An engine 12, which is an internal combustion engine, for example, is provided as the power source for running. Output from the engine 12 is transmitted to left and right driven wheels via the torque converter 14, which is the first example embodiment of the invention, the automatic transmission 16, a differential gear unit, not shown, and a pair of axles and the like.

The torque converter 14 is a fluid power-transmitting device that multiplies torque generated by the engine 12 and transmits it to the automatic transmission 16. The torque converter 14 includes a pump impeller 20, which is connected to a crankshaft 18 of the engine 12, that serves as an input shaft; a turbine runner (i.e., turbine impeller) 24, which is connected to an input shaft 22 of the automatic transmission 16, that serves as an output shaft; and a stator (i.e., a fixed impeller) 30, which is connected to a transmission case 36 (i.e., a housing) via a one-way clutch (i.e., a one-way engaging element) 28, and the like. Also, a lock-up clutch 26 is provided between the pump impeller 20 and the turbine runner 24. The lock-up clutch 26 is a hydraulic friction clutch that applies friction according to differential pressure $\Delta P$ between the hydraulic pressure inside an apply side oil chamber 32 and a release side oil chamber 34. When the lock-up clutch 26 is fully applied, the pump impeller 20 and the turbine runner 24 rotate together as a single unit. Also, by feedback controlling the differential pressure $\Delta P$, i.e., the apply torque, so that the lock-up clutch 26 is applied in a predetermined slip state, the turbine runner 24 follows the rotation of the pump impeller 20 with a predetermined slip amount of approximately 50 rpm, for example, when the vehicle is being driven (i.e., power on); on the other hand, when the vehicle is not being driven (i.e., power off) the pump impeller 20 may follow the rotation of the turbine runner 24 with a predetermined slip amount of approximately −50 rpm, for example.

The automatic transmission 16 has a first transmitting portion 41 which includes a single pinion type first planetary gear set 40 as its main component, and a second transmitting portion 43 which includes a single pinion type second planetary gear set 42 and a double pinion type third planetary gear set 44 as its main components, both of which are on the same axis. The first transmitting portion 41 and the second transmitting portion 43 are used to appropriately change the rate and/or direction of rotation that is input from the input shaft 22 and outputs the changed rotation to an output gear 46. The input shaft 22 corresponds to an input member and is for example a turbine shaft of the torque converter that is rotatably driven by a driving power source such as, for example, an engine. The output gear 46 corresponds to an output member that is in mesh either directly or via a counter shaft with the differential gear unit and drives the left and right driven wheels. The automatic transmission 16 has a generally symmetrical structure with respect to its center line so the half below the center line is omitted in FIG. 1. The same also applies to the following description.

The first planetary gear set 40 which constitutes the first transmitting portion 41 includes three rotating elements, a sun gear S1, a carrier CA1, and a ring gear R1. The carrier CA1 as an intermediate output member rotates slower than the input shaft 22 by rotating the sun gear S1, which is connected to the input shaft 22, and holding the ring gear R1 stationary by a third brake B3 that locks it to the transmission case 36. Further, four rotating elements RM1 to RM4 are formed by portions of the second planetary gear set 42 and the third planetary gear set 44, which together constitute the second transmitting portion 43, that are connected together. More specifically, a sun gear S3 of the third planetary gear set 44 forms the first rotating element RM1. A ring gear R2 of the second planetary gear set 42 and a ring gear R3 of the third planetary gear set 44 are connected together and form the second rotating element RM2. A carrier CA2 of the second planetary gear set 42 and a carrier CA3 of the third planetary gear set 44 are connected together and form the third rotating element RM3, and a sun gear S2 of the second planetary gear set 42 forms the fourth rotating element RM4. The second planetary gear set 42 and the third planetary gear set 44 are structured such that the carrier CA2 also serves as the carrier CA3, and the ring gear R2 also serves as the ring gear R3. Also, the second planetary gear set 42 and the third planetary gear set 44 together form a Ravigneaux type planetary gear train in which the pinion gear of the second planetary gear set 42 also serves as a second pinion gear of the third planetary gear set 44.

The first rotating element RM1 (sun gear S3) is selectively connected to the transmission case 36 by a first brake B1 to prevent the first rotating element RM1 from rotating. Similarly, the second rotating element RM2 (ring gears R2 and R3) is selectively connected to the transmission case 36 by a second brake B2 to prevent the second rotating element RM2 from rotating. Further, the fourth rotating element RM4 (sun gear S2) is selectively connected to the input shaft 22 via a first clutch C1, while the second rotating element RM2 (the ring gears R2 and R3) are selectively connected to the input shaft 22 via a second clutch C2. The first rotating element RM1 (sun gear S3) is integrally connected to the carrier CA1 of the first planetary gear set 40, which serves as the intermediate output member. The third rotating element RM3 (carriers CA2 and CA3) is integrally connected with the output gear 46 and outputs rotation. The first brake B1 to the third brake B3 and the first clutch C1 and the second clutch C2 (hereinafter simply referred to as clutches C and brakes B when there in no need to specify the specific clutch or brake) are all hydraulic friction application devices, such as multiple-disc clutches and brakes, which are controlled to apply friction using hydraulic actuators. The hydraulic circuits of the clutches C and brakes B are switched by energizing and de-energizing linear solenoid valves SL1 and SL2 and solenoid valves Sol1 to Sol5 provided in a hydraulic pressure control circuit 88 shown in FIG. 3, or by a manual valve (not shown).

The clutch and brake application chart shown in FIG. 2 shows the relationship between the application state of the clutches and brakes and the various speeds, with a circle indicating application. In the automatic transmission 16 according to this example embodiment, multiple speeds including six forward speeds are achieved using the three planetary gear sets 40, 42, and 44, the two clutches C1 and C2, and the three brakes B1 to B3. Also, the speed ratios of the speeds are set appropriately according to the gear ratio $\rho 1$ of the first planetary gearset 40, the gear ratio $\rho 2$ of the second planetary gearset 42, and the gear ratio $\rho 3$ of the third planetary gearset 44. For example, the speed ratios shown in FIG. 2 can be obtained by setting $\rho 1$ equal to 0.45, $\rho 2$ equal to 0.38, and $\rho 3$ equal to 0.41.

Figure 3:
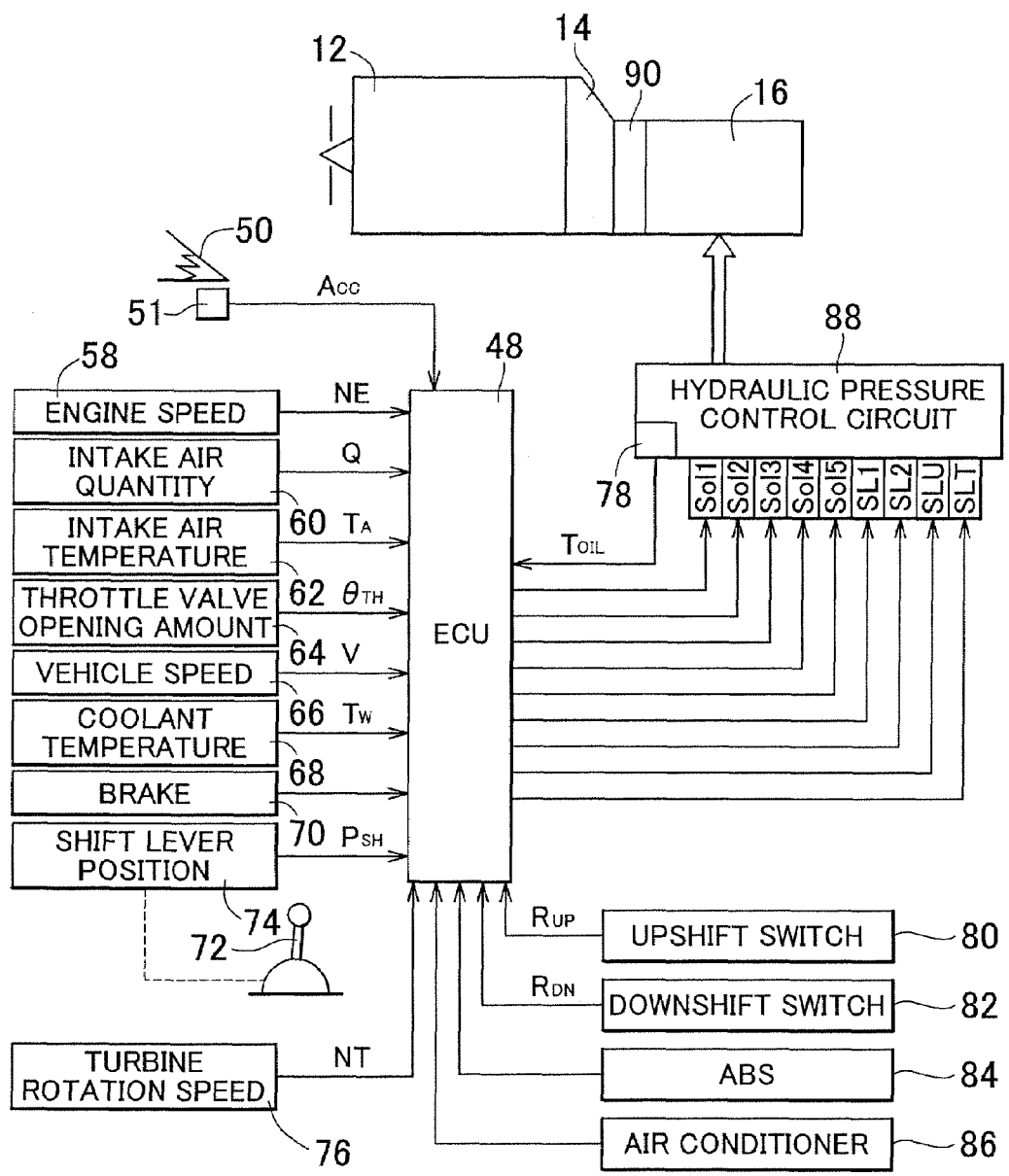
FIG. 3 is a block line diagram illustrating a control system provided in a vehicle, for controlling operation of an engine and automatic transmission and the like shown in FIG. 1.

FIG. 3 is a block line diagram illustrating a control system provided in a vehicle, for controlling operation of the automatic transmission 16 and the lock-up clutch 26 of the torque converter 14, and the like. An electronic control unit (hereinafter referred to as "ECU") 48 shown in FIG. 3 includes a so-called microcomputer provided with a CPU, RAM, ROM, and an input/output interface and the like. The CPU of the ECU 48 executes basic controls such as output control of the engine 12, shift control of the automatic transmission 16, and lock-up clutch control of the lock-up clutch 26 and the like by processing signals according to programs stored beforehand in the ROM while using the RAM to temporarily store data. When necessary, the CPU may be structured such that the portion for engine control is separate from the portion for hydraulic control.

With the control system shown in FIG. 3, an accelerator operation amount sensor 51 detects the accelerator operation amount Acc, which is the amount by which the accelerator pedal 50 is depressed. The accelerator pedal 50 is depressed according to the amount of output required by a driver. The accelerator operation amount Acc indicates the required output amount. In addition, various other sensors and switches are provided, some of which include an engine speed sensor 58 for detecting the speed $N_E$ of the engine 12; an intake air quantity sensor 60 for detecting the intake air quantity Q of the engine 12; an intake air temperature sensor 62 for detecting the temperature $T_A$ of the intake air; a throttle sensor 64, with an idling switch, for detecting when an electronic throttle valve, not shown, is fully closed (i.e., when the engine 12 is idling) as well as detecting the opening amount $\theta_{TH}$ of the electronic throttle valve; a vehicle speed sensor 66 for detecting the vehicle speed V, which corresponds to a rotation speed $N_{OUT}$ of the output gear 46; a coolant temperature sensor 68 for detecting the coolant temperature $T_W$ of the engine 12; a brake switch 70 for detecting operation of the foot brake, i.e., the service brake; a shift lever position sensor 74 for detecting a position (i.e., operating position) $P_{SH}$ of the shift lever 72; a turbine rotation speed sensor 76 for detecting the turbine rotation speed $N_T$, which corresponds to a rotation speed $N_{IN}$ of the input shaft 22; an automatic transmission (AT) oil temperature sensor 78 for detecting the AT oil temperature $T_{OIL}$, i.e., the temperature of the hydraulic fluid in the hydraulic pressure control circuit 88; an upshift switch 80, and a downshift switch 82. These sensors and switches send various signals to the ECU 48 that indicate, for example, the engine speed $N_E$, the intake air quantity Q, the intake air temperature $T_A$, the throttle valve opening amount $\theta_{TH}$, the vehicle speed V, the engine coolant temperature $T_W$, brake operation, the position $P_{SH}$ of the shift lever 72, the turbine rotation speed $N_T$, the AT oil temperature $T_{OIL}$, an upshift command $R_{UP}$ of the shift range, and a downshift command $R_{DN}$ of the shift range, and the like. Further, the ECU 48 is also connected to an ABS (anti-lock braking system) 84 that controls the braking force in the wheels so that the wheels will not lock up (i.e., slip) when the foot brake is operated. The ECU 48 thus also receives information regarding the brake hydraulic pressure corresponding to the braking force, and the like. In addition, the ECU 48 also receives a signal from an air conditioner 86 indicative of its operation.

The hydraulic pressure control circuit 88 shown in FIG. 3 includes, in addition to the solenoid valves Sol1 to Sol5 and the linear solenoid valves SL1 and SL2 for shifting described above, a linear solenoid valve SLU that mainly controls the lockup hydraulic pressure, i.e., the differential pressure $\Delta P$ between the hydraulic pressure in the apply side oil chamber 32 and the hydraulic pressure in the release side oil chamber 34, and a linear solenoid valve SLT that mainly controls the line hydraulic pressure, and the like. The hydraulic fluid in the hydraulic pressure control circuit 88 is also used to lubricate various parts in the automatic transmission 16 and the like as well as supplied to the lock-up clutch 26. Also, the hydraulic pressure friction application devices of the automatic transmission 16 and the lock-up clutch 26 are controlled by the hydraulic pressure control circuit 88 using as the base pressure the hydraulic pressure generated by a mechanical oil pump 90, which is mechanically connected to the engine 12. The mechanical oil pump 90 is directly driven by the engine and rotates in sync with the engine speed.

Figure 4:
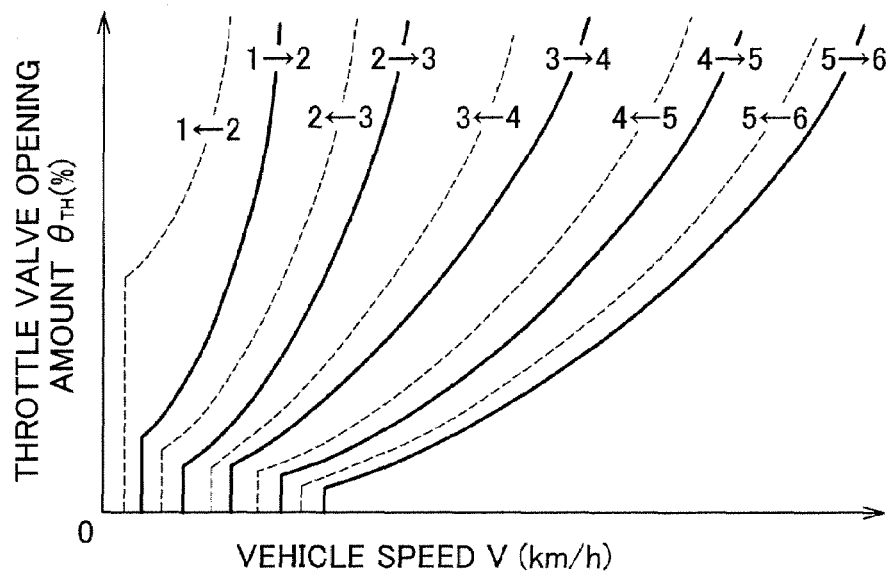
FIG. 4 is a view showing one example of a shift map used in shift control of the automatic transmission that is executed by an electronic control unit shown in FIG. 3.
Figure 5:
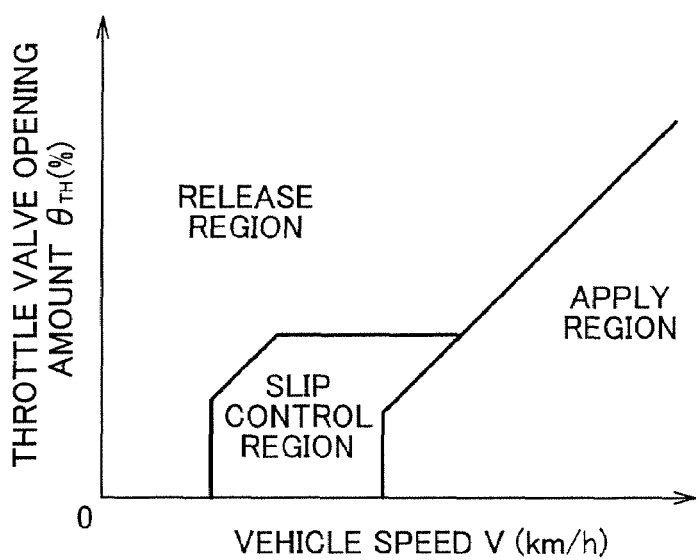
FIG. 5 is a view illustrating the relationship between throttle valve opening amount and vehicle speed used in the control of the application state of a lock-up clutch, which is executed by the electronic control unit shown in FIG. 3.

The ECU 48 performs shift control of the automatic transmission 16 and lock-up clutch control of the lock-up clutch 26, and the like. The shift control of the automatic transmission 16 determines the gear speed into which the automatic transmission 16 should be shifted, i.e., selects the gear speed to shift into from the current gear speed, based on the actual throttle opening amount $\theta_{TH}$ and the vehicle speed V from a shift map (shift line diagram) such as that shown in FIG. 4, for example, which is stored in advance, according to the shift lever position $P_{SH}$ of the shift lever 72. The shift control then executes a shift output that starts an operation to shift the automatic transmission 16 into the selected gear speed. The solid line in FIG. 4 is an upshift line and the broken line is a downshift line. The automatic transmission 16 switches into a lower gear speed having a larger speed ratio (=input rotation speed $N_{IN}$/output rotation speed $N_{OUT}$) as the vehicle speed V decreases or the throttle valve opening amount $\theta_{TH}$ increases. Numerals "1" to "6" in the drawing refer to a first gear speed "1st" to a sixth gear speed "6th", respectively. Also, the lock-up clutch control of the lock-up clutch 26 continuously controls the apply torque, i.e., the apply force, of the lock-up clutch 26. For example, the lock-up clutch control controls the apply state of the lock-up clutch 26 according to a map of a release region, a slip control region, and an apply region, which is stored beforehand with the throttle valve opening amount $\theta_{TH}$ and the vehicle speed V as parameters, as shown in FIG. 5. The lock-up clutch control outputs a drive duty ratio $D_{SLU}$ which is a drive signal for the solenoid valve SLU that controls the differential pressure $\Delta P$ of the lock-up clutch 26 in order to control a rotation speed difference (i.e., slip amount) $N_{SLP}$ between the turbine rotation speed $N_T$ and the engine speed $N_E$ (i.e., $N_{SLP}=N_E-N_T$) to a target rotation speed $N_{SLP}^*$. In the slip control, the lock-up clutch 26 is maintained in a slip state in order to suppress power transmission loss of the torque converter 14 as much as possible while absorbing rotational fluctuations in the engine 12 with the aim of improving fuel efficiency as much as possible without adversely affecting drivability.

Figure 6:
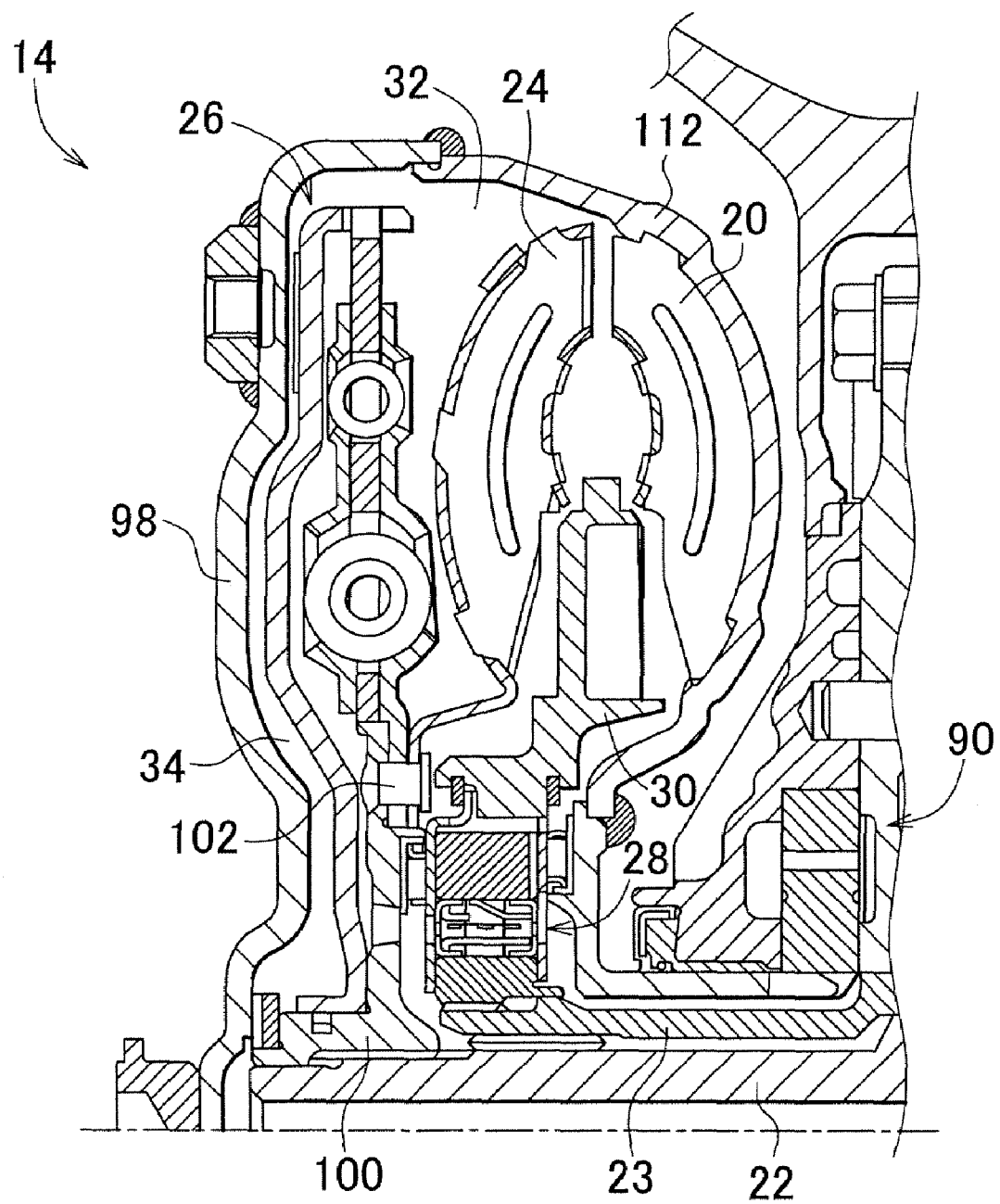
FIG. 6 is a detailed sectional view of the structure of the torque converter shown in FIG. 1.

FIG. 6 is a detailed sectional view of the structure of the torque converter 14. The torque converter 14 includes the pump impeller 20, the turbine runner 24, the lock-up clutch 26, the one-way clutch 28, and the stator 30 and the like described above.

The pump impeller 20 is connected both to a rear case 112 and a front case 98, which are connected to the crankshaft 18 that transmits output of the engine 12, and rotate at the same speed and around the same axis as the crankshaft 18. When the front case 98 rotates due to the engine 12 being driven, the pump impeller 20 rotates together with the front case 98. As the pump impeller 20 rotates, hydraulic fluid filled in the pump impeller 20 is pushed against vanes inside the pump impeller 20 and rotated, and as it does so, it is driven outward in the circumferential direction by the centrifugal force generated by that rotation. The hydraulic fluid then strikes the vanes of the turbine runner 24, which is arranged facing the pump impeller 20. The force of the hydraulic fluid striking the vanes of the turbine runner 24 causes the turbine runner 24 to rotate, after which the hydraulic fluid flows along the curve of the vanes of the turbine runner 24 and back to the pump impeller 20 through the stator 30, thus circulating through the torque converter 14.

Also, when the relative rotation speed difference between the pump impeller 20 and the turbine runner 24 is relatively large, such as when the pump impeller 20 starts to rotate, the hydraulic fluid flows out from the turbine runner 24 in a direction that impedes rotation of the pump impeller 20. By providing the stator 30 between the pump impeller 20 and the turbine runner 24 via the one-way clutch 28 that is splined to a tube-like fixed shaft 23, which is a non-rotating member provided integrally with the transmission case 36, however, the hydraulic fluid is redirected by vanes on the stator 30 in a direction that assists with the rotation of the pump impeller 20. When the rotation speed of the turbine runner 24 increases or the relative rotation speed difference between the pump impeller 20 and the turbine runner 24 decreases, on the other hand, the stator 30 impedes the flow of hydraulic fluid. However, the stator 30 freewheels via the one-way clutch 26 and thus does not impede the flow of hydraulic fluid as it otherwise would. The turbine runner 24 is connected by a rivet 102 to a turbine hub 100, which is splined to the input shaft 22 of the automatic transmission 16, which corresponds to the output shaft. With this structure, when the turbine runner 24 rotates, that rotation is transmitted from the input shaft 22 to the automatic transmission 16 via the turbine hub 100.

Figure 7:
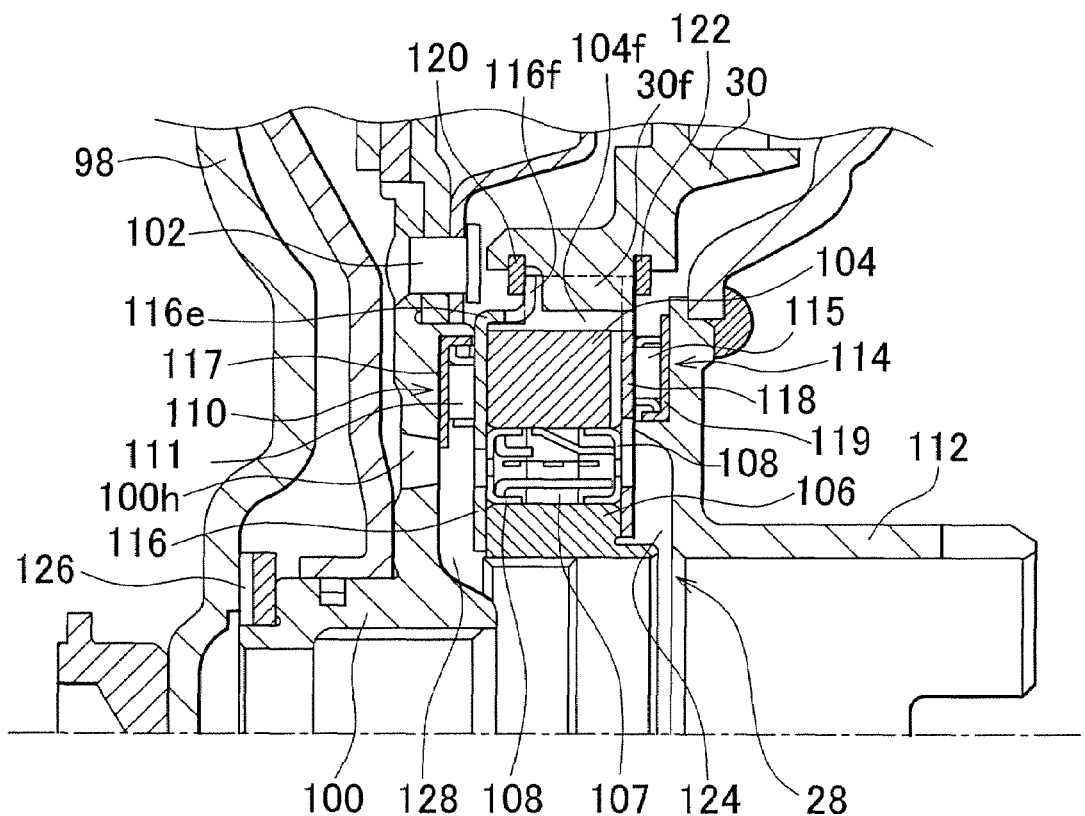
FIG. 7 is an enlarged sectional view detailing a portion of the structure near the one-way clutch of the torque converter shown in FIG. 6.

FIG. 7 is an enlarged sectional view detailing a portion of the structure near the one-way clutch 28 of the torque converter 14. As shown in FIG. 7, the one-way clutch 28 includes an outer race 104 arranged on the inner peripheral side of the stator 30, an inner race 106 arranged on the outer peripheral side of the fixed shaft 23, which is a non-rotating member, and a sprag 107 and a pair of end bearings 108 arranged in the space between the outer race 104 and the inner race 106. Also, a thrust bearing 110 is arranged in the space between the outer race 104 and the turbine hub 100 so that the outer race 104 can rotate in the circumferential direction with respect to the turbine hub 100 while being supported in the axial direction. Similarly, a thrust bearing 114 is arranged in the space between the outer race 104 and the rear case 112, which is integrally formed with the front case 98 and thus rotates together with the front case 98. As a result, the outer race 104 can rotate in the circumferential direction with respect to the rear case 112 while being supported in the axial direction.

The thrust bearing 110 includes a plurality of rollers (i.e., rolling bodies) 111 aligned in the radial direction and separated from one another in the circumferential direction by predetermined intervals, and a pair of disc-shaped thrust-bearing races 116 and 117 which sandwich the plurality of rollers 111. The thrust-bearing race 116 is arranged between the rollers 111 and the outer race 104, and the thrust-bearing race 117 is arranged between the rollers 111 and the turbine hub 100. Similarly, the thrust bearing 114 includes a plurality of rollers (i.e., rolling bodies) 115 aligned in the radial direction and separated from one another in the circumferential direction by predetermined intervals, and a pair of disc-shaped thrust-bearing races 118 and 119 which sandwich the plurality of rollers 115. The thrust-bearing race 118 is arranged between the rollers 115 and the outer race 104, and the thrust-bearing race 118 is arranged between the roller 115 and the rear case 112.

The outer race 104 is a stepped structure (i.e., has different dimensions in the radial direction) with at least one step in the axial direction, having a large diameter portion with relatively large dimensions in the radial direction and a small diameter portion with relatively small dimensions in the radial direction. Also, at least one groove 104f is formed extending all the way through in the axial direction in the outer peripheral surface of the outer race 104. A protruding portion 30f, which protrudes toward the inner peripheral side and fits into that groove 104f, is formed on the inner peripheral side of the stator 30. When the torque converter 14 is assembled, the protruding portion 30f formed on the inner peripheral surface of the stator 30 fits into the groove 104f formed in the outer peripheral surface of the outer race 104, thus preventing the stator 30 from rotating relative to the outer race 104 in the circumferential direction, i.e., the stator 30 and the outer race 104 rotate together as a single unit around a common axis. Also, an edge portion 116e which extends in the axial direction of the stator 30 so as to cover the outer periphery of the small diameter portion of the outer race 104, as well as a hook-shaped pawl portion 116f that extends (offset) in the axial direction from an end portion in the axial direction of that edge portion 116e, are formed on an outer peripheral portion of the thrust bearing race 116 on the turbine hub 100 side of the thrust bearing 110. A plurality (the number being equal to the number of grooves 104) of these pawl portions 116f may also be provided so as to be able to fit into the grooves 104f of the outer race 104. That is, when the torque converter 14 is in an assembled state, the pawl portions 116f formed on the outer peripheral portion of the thrust-bearing race 116 fit into the grooves 104f formed in the outer peripheral surface of the outer race 104 in a bell-and-spigot configuration in which the edge portion 116e covers the end portion of the small diameter portion of the outer race 104 and the thrust-bearing race 116 contacts one end surface of the outer race 104 in the axial direction. According to this structure, the thrust-bearing race 116 is prevented from rotating relative to the outer race 104 in the circumferential direction, i.e., the thrust-bearing race 116 and the outer race 104 rotate together as a single unit around a common axis.

Also, the pawl portion 116f also functions as an engaging portion that engages with a snap ring 120. When the thrust-bearing race 116 is in a state assembled onto the torque converter 14, the snap ring 120 is provided on the inner peripheral side of the stator 30 so as to overlap with the pawl portion 116f of the thrust-bearing race 116 in the radial direction of the stator 30 while a snap ring 122 is provided on the inner peripheral side of the stator 30 so as to overlap with the outer peripheral portion of the thrust-bearing race 118 in order to prevent the outer race 104, the thrust-bearing race 116, and the thrust-bearing race 118 from moving relative to the stator 30 in the axial direction. The thrust-bearing races 116 and 118 are arranged adjacent to one end surface in the axial direction of the outer race 104, the inner race 106, and the end bearing 108, and function as support members to inhibit the end bearing 108 from moving relative to the outer race 104 and the inner race 106 in the axial direction. According to this structure, the stator 30 is allowed to rotate in one direction but prevented from rotating in the reverse direction with respect to the fixed shaft 23 so that the torque converter 14 operates as described above. Torque generated from the engine 12, which is the power source, is then appropriately multiplied and transmitted to the automatic transmission 16.

Also, a plurality of oil holes are provided in the torque converter 14 for transferring hydraulic fluid controlled by the hydraulic pressure control circuit 88. As described above, the application state of the lock-up clutch 26 provided in the torque converter 14 is controlled by hydraulic fluid supplied from the hydraulic pressure control circuit 88, and hydraulic fluid transferred through the plurality of oil holes (i.e., oil paths) described below is related to the control of the application state of the lock-up clutch 26. That is, the torque converter 14 is provided with a first oil path (an apply oil path) 124 for introducing hydraulic fluid that has been pressure-regulated by the hydraulic fluid control circuit 88 into the apply side oil chamber 32, a second oil path (a release oil path) 126 for introducing hydraulic fluid that has been pressure-regulated by the hydraulic fluid control circuit 88 into the release side oil chamber 34, and a third oil path 128 for discharging hydraulic fluid from the apply side oil chamber 32. The differential pressure $\Delta P$ between the hydraulic pressure in the apply side oil chamber 32 and the hydraulic pressure in the release side oil chamber 34 is controlled by the hydraulic pressure control circuit 88 by transferring hydraulic fluid between the hydraulic pressure control circuit 88, the apply side oil chamber 32 and the release side oil chamber 34 via these oil paths. Here, as shown in FIG. 7, the turbine hub 100 has a through-hole 100h that extends through the turbine hub 100 in the axial direction (that is, in the direction of the rotational axis, i.e., in the axial direction of the input shaft 22). In this example embodiment, the through-hole 100h functions as an oil hole for transferring hydraulic fluid and forms a portion of the third oil path 128 for discharging hydraulic fluid from the apply side oil chamber 32.

Figure 8:
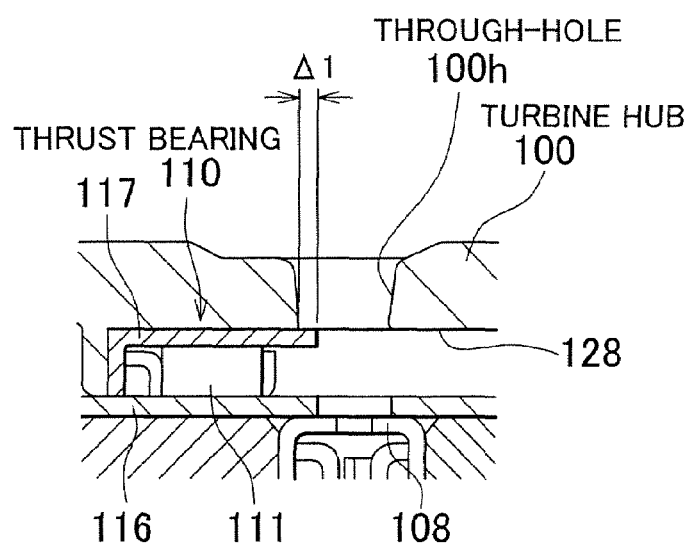
FIG. 8 is an enlarged sectional view detailing the structure of a portion near a through-hole in a turbine hub of the torque converter shown in FIG. 6, the portion corresponding to portion VIII, which is outlined by a thin broken line in FIG. 9.
Figure 9:
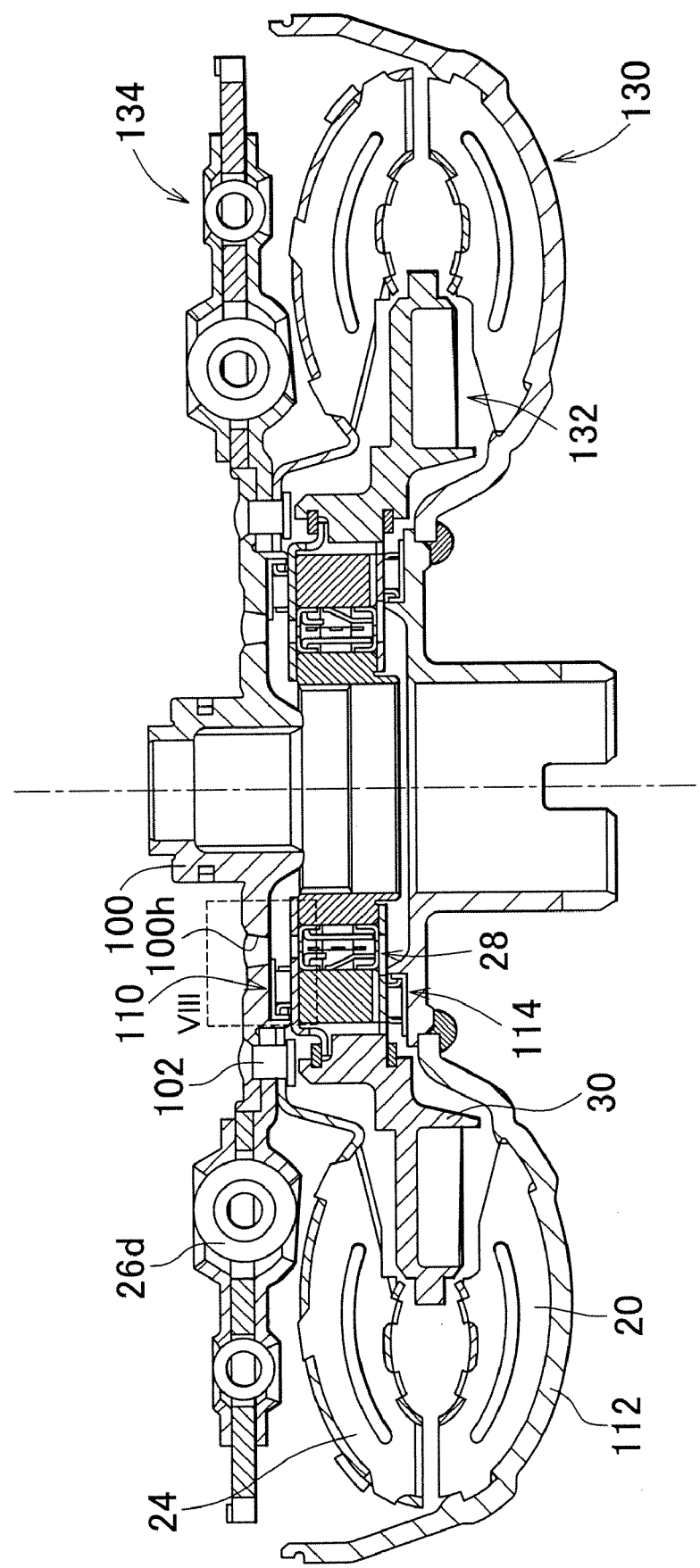

FIG. 8 is a further enlarged sectional view detailing the structure of a portion near the through-hole 100h in the torque converter 14 (i.e., portion VIII which is outlined by a thin broken line in FIG. 9). As shown in the drawing, the through-hole 100h is such that, when the thrust bearing 110 is properly assembled onto the turbine hub 100, an inner peripheral edge portion of the thrust-bearing race 117 that contacts the turbine hub 100, from among the pair of thrust-bearing races 116 and 117 of the thrust bearing 110, covers a portion of the through-hole 100h. In other words, the through-hole 100h and the thrust bearing 110 are provided so that a portion of a member forming the thrust bearing 110 overlaps with the through-hole 100h. An overlap length $\Delta l$ (see FIG. 8) of the thrust-bearing race 117 with respect to the through-hole 100h is appropriately determined in a range that enables assembly to be checked, as described in detail below, but which does not impede the function of the through-hole 100h as an oil hole.

FIG. 9 is a sectional view of the torque converter 14 as it appears during assembly in the manufacturing process and the like. The torque converter 14 may be assembled according to the following steps, for example. That is, the pump side thrust bearing 114 (the portion excluding the thrust bearing race 118) is first assembled in the first step using a pump sub-assembly 130 in which the pump impeller 20 is assembled inside the rear case 112 as a base. Next in the second step, a stator sub-assembly 132 in which the one-way clutch 28 is arranged on the inner peripheral side of the stator 30 and the thrust-bearing races 116 and 118 are retained at both ends of the one-way clutch 28 by the snap rings 120 and 121 is assembled. Then in the third step, the turbine side thrust bearing 110 (the portion excluding the thrust bearing race 116) is assembled. Next, in the fourth step, a turbine sub-assembly 134 in which the turbine runner 24 and a damper 26d of the lock-up clutch 26 are connected to the turbine hub 100 via a rivet 102 is assembled. Next in the fifth step, assembly of the turbine side thrust bearing 110 is checked. Then in the sixth step and thereafter, the front case 98 and the like are assembled. In this way, the torque converter 14 such as that shown in FIG. 6 is manufactured.

Figure 10:
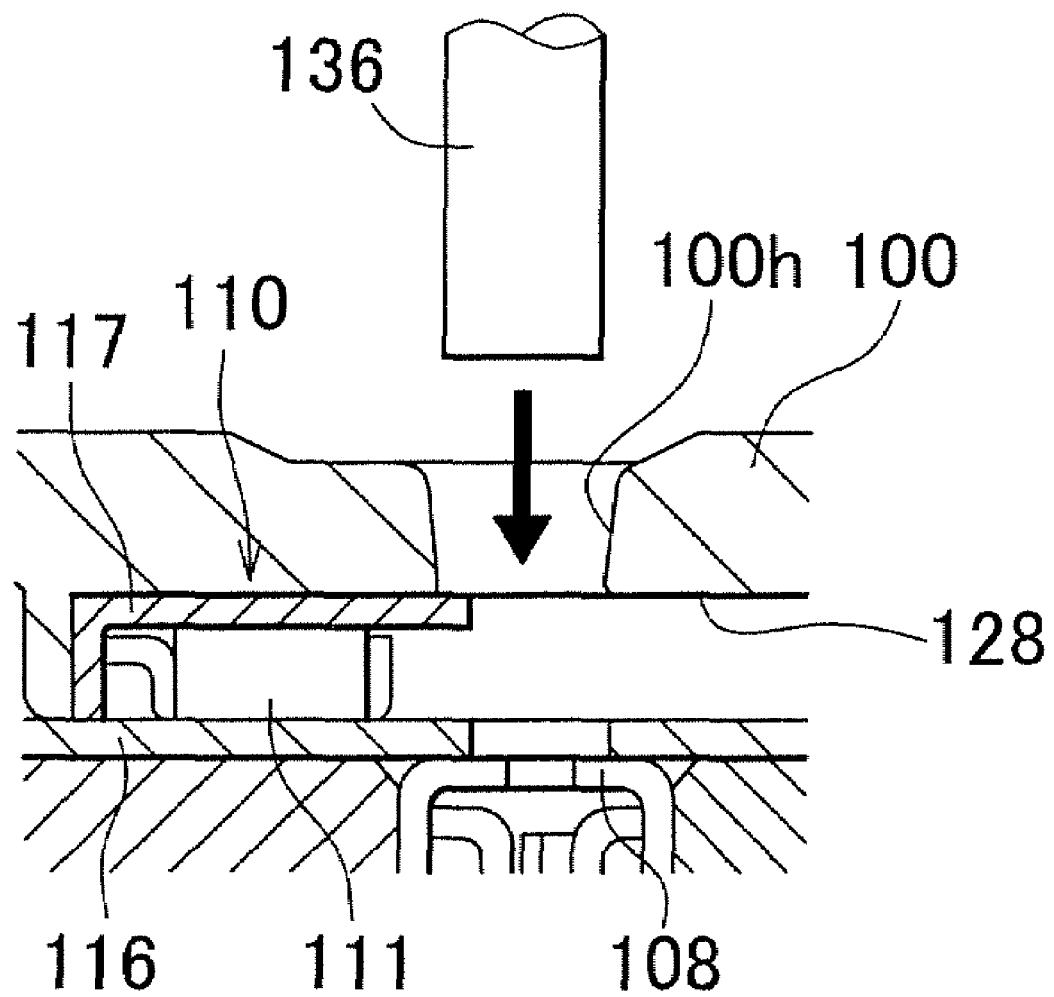
FIG. 10 is a partial sectional view illustrating a method for checking assembly of a turbine side thrust bearing according to a second example embodiment of the invention.

FIG. 10 is a partial sectional view illustrating a method for checking assembly of the turbine side thrust bearing 110 according to this example embodiment of the invention (this drawing corresponds to FIG. 8). As shown in FIG. 10, in the fifth step in this example embodiment, assembly of the turbine side thrust bearing 110 is checked by checking whether a pin 136, which has radial dimensions that enable it to be inserted through the 100h formed in the turbine hub 100, can be inserted through that through-hole 100h when the turbine sub-assembly 134 including the turbine hub 100 has been assembled. The radial dimensions of the pin 136 used for this check must at least enable the pin 136 to just fit through the through-hole 100h when the thrust bearing 110 is not in an assembled state, but not enable the pin 136 to be inserted through the through-hole 100h when the thrust bearing 110 (i.e., the thrust-bearing race 117) has been assembled. With this combination of the through-hole 100h and the pin 136, when a portion of the through-hole 100h is covered by the inner peripheral edge portion of the thrust bearing race 117, the pin 136 is stopped by that thrust bearing race 117 and unable to protrude through to the thrust bearing race 117 side. On the other hand, if a portion of the through hole 100h is not covered by the inner peripheral edge portion of the thrust-bearing race 117, the pin 136 is able to protrude through the through-hole 100h to the thrust-bearing race 117 side. Therefore, if, upon insertion of the pin 136 into the through-hole 100h in the fifth step, the pin 136 is inserted into the through-hole 100h but unable to protrude through to the thrust-bearing race 117 side, the thrust bearing 110 is determined to be assembled properly. On the other hand, if, upon insertion of the pin 136 into the through-hole 100h in the fifth step, the pin 136 is inserted into the through-hole 100h and is able to protrude through to the thrust bearing race 117 side, it is determined that either the thrust bearing 110 is not assembled or that it was assembled improperly. This check using the pin 136 may be performed manually (i.e., by a person) or mechanically (automatically) by a checking machine that includes the pin 136.

In this way, the turbine hub 100 of this example embodiment has a through-hole 100h that protrudes through the turbine hub 100 in the axial direction. This through-hole 100h is provided such that a portion of it is covered by a portion of the thrust bearing 110 when the thrust bearing 110 has been properly assembled onto the turbine hub 100. Therefore, assembly of the thrust bearing 110 can be checked by the relative positional relationship of the through-hole 100h and the thrust bearing 110. That is, when a portion of the through-hole 100h is not covered by a portion of the thrust bearing 110, it can be determined that either the thrust bearing 110 is not assembled or that it was assembled improperly. That is, a torque converter 14 in which assembly of the thrust bearing 110 can be easily checked can be provided.

Also, the through-hole 100h may be an oil hole for transferring hydraulic fluid. Therefore, assembly of the thrust bearing 110 can be easily checked using an oil hole formed in the turbine hub 100 as part of the third oil path 128.

Further, the thrust bearing 110 includes the plurality of rollers 111, which are aligned in the radial direction and separated by predetermined intervals in the circumferential direction, and the pair of disc-shaped thrust bearing races 116 and 117 that sandwich the plurality of rollers 111. Assembly of the thrust bearing 110 can be easily checked using a practical structure because the inner peripheral edge portion of the thrust bearing race 117, which contacts the turbine 100, from among the pair of thrust bearing races 116 and 117, is shaped to cover a portion of the through-hole 100*h*.

Moreover, when the turbine hub 100 is assembled onto the torque converter 14, assembly of the thrust bearing 110 is checked by checking whether the pin 136, having radial dimensions enabling it to be inserted through the through-hole 100*h*, can be inserted at least a predetermined amount through that through-hole 100*h*. If a portion of the thrust bearing 110 is not covering a portion of the through-hole 100*h*, the pin 136 is able to protrude through the through-hole 100*h*. Thus, if the pin 136 protrudes through the through-hole 100*h*, it means that either the thrust bearing 110 is not assembled or that it was not assembled properly. That is, a method for easily checking the assembly of the thrust bearing 110 of the torque converter 14 is provided.

While example embodiments of the invention have been described in detail with reference to the drawings, the invention is not limited to these example embodiments. To the contrary, the invention may be carried out in other modes as well.

For example, in the foregoing example embodiment, the through-hole 100*h* functions as an oil hole for transferring hydraulic fluid. The invention is not limited to this, however. That is, a through-hole that does not particularly serve as an oil hole and that is formed in the turbine hub 100 may also be used to check assembly of the thrust bearing 110.

Also, in the foregoing example embodiments, an example was given in which assembly of the thrust bearing 110 is checked by checking whether the pin 136 having radial dimensions enabling it to be inserted through the through-hole 100*h* is able to be inserted through that through-hole 100*h* while the turbine hub 100 is assembled onto the torque converter 14. Alternatively, however, the overlapping portion of the thrust-bearing race 117, with respect to the through-hole 100*h*, may be checked visually or optically and assembly of the thrust bearing 110 may be checked visually by a person or optically by a machine.

Furthermore, although not particularly mentioned in the foregoing example embodiments, it is sufficient that at least one through-hole 100*h* be provided, i.e., it is not absolutely necessary that a plurality of the through-holes 100*h* be provided.

The invention is also intended to cover various other modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A vehicular torque converter comprising:
    a turbine hub that fixes a turbine runner to an output shaft such that the turbine runner does not rotate relative to the output shaft in a circumferential direction;
    a one-way clutch arranged on an inner peripheral side of a stator; and
    a thrust bearing, which is disposed on the turbine hub and supports the one-way clutch with respect to the turbine hub, such that the one-way clutch is able to rotate relative to the turbine hub in the circumferential direction,
    wherein the thrust bearing includes a thrust bearing race that contacts the turbine hub, and
    wherein the turbine hub includes a through-hole, which extends through the turbine hub in an axial direction, and the thrust bearing race covers part of the through-hole.

2. The vehicular torque converter according to claim 1, wherein the through-hole is an oil hole for transferring hydraulic fluid.

3. The vehicular torque converter according to claim 1, wherein the thrust bearing race includes an inner peripheral edge portion that covers part of the through-hole.

4. The vehicular torque converter according to claim 1, wherein the thrust bearing includes a plurality of rollers aligned in a radial direction separated by predetermined intervals in the circumferential direction, and
    wherein the thrust bearing race is positioned between the turbine hub and the plurality of rollers.

5. The vehicular torque converter according to claim 1, wherein the thrust bearing race includes an outer surface that extends radially from a center of the thrust bearing race at a location closest the turbine hub in the axial direction, and
    wherein the outer surface of the thrust bearing race contacts the turbine hub.

6. The vehicular torque converter according to claim 5, wherein the thrust bearing race includes an inner peripheral edge portion that extends axially towards the center of the thrust bearing race from the outer surface, and
    wherein the inner peripheral edge portion of the thrust bearing race covers part of the through-hole.

7. A vehicular torque converter comprising:
    a turbine hub that fixes a turbine runner to an output shaft such that the turbine runner does not rotate relative to the output shaft in a circumferential direction;
    a one-way clutch arranged on an inner peripheral side of a stator; and
    a thrust bearing, which is disposed on the turbine hub and supports the one-way clutch with respect to the turbine hub such that the one-way clutch is able to rotate relative to the turbine hub in the circumferential direction,
    wherein the turbine hub includes a through-hole, which extends through the turbine hub in an axial direction, and a portion of the thrust bearing covers part of the through-hole when the thrust bearing has been properly assembled onto the turbine hub, and
    wherein the thrust bearing includes a plurality of rollers aligned in a radial direction, separated by predetermined intervals in the circumferential direction, and a pair of disc-shaped thrust-bearing races, which sandwich the plurality of rollers, and an inner peripheral edge portion of one of the disc-shaped thrust-bearing races that contacts the turbine hub, from among the pair of disc-shaped thrust bearing races, covers part of the through-hole.

8. The vehicular torque converter according to claim 7, wherein the through-hole is an oil hole for transferring hydraulic fluid.

* * * * *